V. L. CAPWELL.
VALVE GEAR.
APPLICATION FILED JULY 2, 1914.
1,129,272.  Patented Feb. 23, 1915.
FIG. 1.
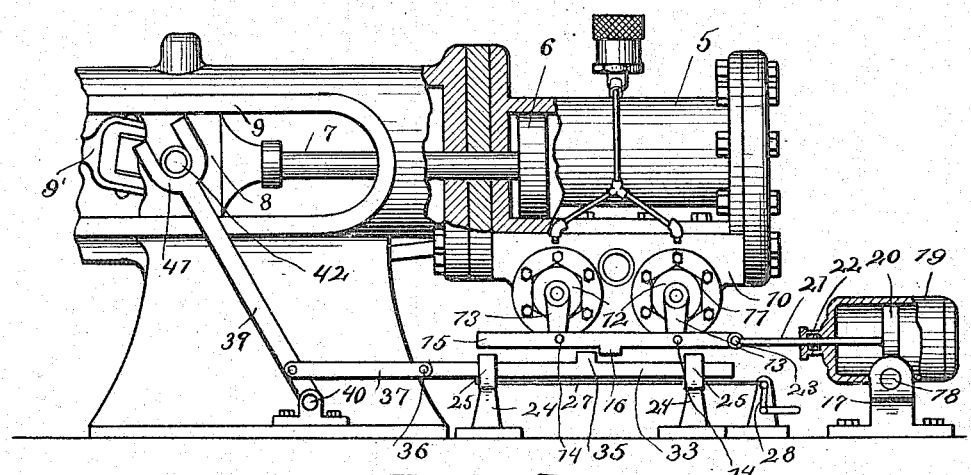
FIG. 2.
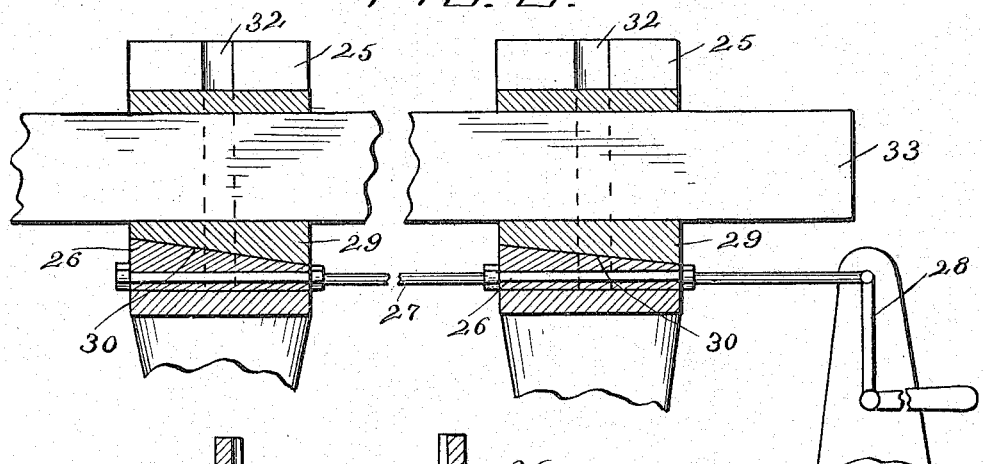
FIG. 3.
Witnesses
Wynne Johnson
Inventor
Vernon L. Capwell
By C. L. Parker
Attorneys

UNITED STATES PATENT OFFICE.

VERNON L. CAPWELL, OF DORRANCETON, PENNSYLVANIA.

VALVE-GEAR.

1,129,272.   Specification of Letters Patent.   Patented Feb. 23, 1915.

Application filed July 2, 1914. Serial No. 848,628.

*To all whom it may concern:*

Be it known that I, VERNON L. CAPWELL, a citizen of the United States, residing at Dorranceton, in the county of Luzerne and State of Pennsylvania, have invented certain new and useful Improvements in Valve-Gear, of which the following is a specification.

My invention relates to valve gears and has particular reference to a trip operated valve gear to move the valve or valves of an engine operated by steam, compressed air or the like.

An important object of the invention is to provide a valve gear, formed of few and simple parts, which is inexpensive to manufacture, durable, and convenient in use.

A further object of the invention is to provide a valve gear of the above mentioned character, which is so constructed that the valve or valves are released at the proper time and instantaneously returned to their normal cut off positions for cutting off both the supply and exhaust of the steam to and from the cylinder, whereby a portion of the exhaust is entrapped in that end of the cylinder toward which the piston is traveling to form a shock absorbing cushion, saving the piston from undue wear and carrying the crank over dead center, without undue strain upon the crank and wrist pin.

A further object of the invention is to provide means for adjusting the valve gear to regulate the stroke of the valve of valves.

A further object of the invention is to provide an improved valve gear of such construction that the eccentrics, links, and the like employed in the ordinary form of valve gears are dispensed with, the improved valve gear being arranged exteriorly of the engine, in a readily accessible position thus dispensing with the necessity of the engineer or operator going into dangerous positions, in proximity to moving parts.

A further object of the invention is to provide means to automatically return the valve or valves to their normal cut off position, upon being tripped, and retain them in such position against accidental movement.

Other objects and advantages of the invention will be apparent during the course of the following description.

In the accompanying drawings forming a part of this specification and in which like numerals are employed to designate like parts throughout the same, Figure 1 is a side elevation of a valve gear embodying my invention, Fig. 2 is a side view of the adjusting means to raise and lower the operating rod to change the stroke of the valves, and, Fig. 3 is a sectional view taken on line 3—3 of Fig. 2.

In the drawings, wherein for the purpose of illustration is shown a preferred embodiment of my invention, the numeral 5 designates a cylinder, which is shown horizontally arranged simply for the purpose of illustration. Mounted to reciprocate within the cylinder 5 is a piston 6, connected with a piston rod 7, extending forwardly exteriorly thereof for connection with a cross head 8 operating within a cross head guide 9, as shown. Connected with the cross head 8 is a pitman 9' extending to the ordinary crank-shaft (not shown). Preferably arranged below the cylinder 5 is a steam chest 10, having communication with the opposite ends of the cylinder to supply and exhaust steam to and from the same. The steam chest 10 has openings or bores 11 receiving swinging valves 12, controlling the supply and exhaust of steam, compressed air, or the like to the opposite ends of the cylinder. The valves 12 are turned by depending cranks 13 which are rigidly connected therewith. When these valves 12 are in their normal closed position and the cranks 13 are perpendicular, they serve to cut off both the exhaust and supply of steam to and from the cylinder. As no claim is made to these valves *per se* it is thought that no further description thereof is necessary, it being sufficient to state that these valves are preferably of the construction shown and described in my copending application for engine, filed October 29, 1913, Serial No. 798,129.

Pivotally connected with the lower ends of the depending cranks 13, as shown at 14, is an operated reciprocatory rod 15, which is substantially horizontal during its movement, the same being raised and lowered by the swinging movement of the cranks. The reciprocatory operated rod 15 is provided preferably between its ends with a depending trip-lug or element 16, for a purpose to be described.

Arranged near the rear end of the cylinder 5 is a stationary forked bracket 17, upon which is pivoted as shown at 18, a swinging cylinder 19, included in the automatic valve returning apparatus. This swinging cylinder is air tight, and has a plunger 20 mounted to reciprocate therein and connected with a rod 21 operating through a stuffing box 22. The plunger rod 21 is pivoted to the operated reciprocatory rod 15 as shown at 23.

From the foregoing description, it is obvious that when the valves 12 are in the normal cut off position, the plunger 20 occupies the central position within the cylinder 19. When the valves 12 are swung in either direction, the plunger 20 is moved toward one end of the cylinder 19, creating a vacuum upon one side of the plunger and an increased pressure upon the other side. When the operated rod 15 is tripped as will be explained, the unequal pressures upon the opposite sides of the plunger quickly return the same to the normal central position and retaining the same in such position against improper movement.

Arranged preferably below the cylinder 5 are stationary guide brackets 24, the upper ends of which are provided with forked heads 25, as shown. Mounted to slide within these forked heads are tapered or wedge-shaped adjusting elements or blocks 26, which are connected by a rod 27. One end of the rod 27 extends outwardly beyond one block 26 and is pivotally connected with one arm of a pivoted bell crank lever 28. This bell crank lever may be moved either by a centrifugal governor or manually and may be held stationary by any suitable means. Arranged upon the tapered adjusting elements or blocks 26 are guide blocks 29, having their lower faces inclined or beveled, as shown at 30. The opposite sides of the guide blocks 29 are preferably provided with vertical tongues 31, operating within vertical grooves 32 in the forked heads 25, whereby these guide blocks can move vertically but do not partake of perceptible horizontal movement. The guide blocks are provided with horizontal openings, to receive a horizontal reciprocatory operating rod or member 33, provided preferably between its ends with an upstanding trip-lug or element 35, to engage and disengage the depending trip-element or lug 16.

Pivotally connected, as shown at 36, to the forward end of the operating rod 33 is a pitman or link 37, pivotally connected at 38 with a vertically swinging lever 39. This vertically swinging lever has its lower end pivated at 40 while its upper end is provided with a forked head 41, receiving a laterally extending pin 42, carried by the cross head 8.

The operation of the apparatus is as follows:—In Fig. 1, I have shown the piston 6 as moved to the end of its forward travel, with the valves 12 in the normal position, whereby the exhaust and supply of steam are both cut off. The entrapped exhaust within the forward end of the cylinder 5 is compressed, forming a cushion, absorbing undue shocks and aiding in carrying the crank over dead center. Upon the rearward movement of the piston 6, the cross head 41 moves rearwardly, whereby the vertically swinging lever 39 swings rearwardly. The pitman 37 now moves the operating rod 33 rearwardly, whereby lug 35 engages lug 16, causing the operated rod 15 to move rearwardly. This operated rod upon moving rearwardly turns the valve 12, introducing steam into the forward end of the cylinder 5 and exhausting steam upon the opposite end thereof. Upon this rearward movement of the operating rod 15, said rod is elevated, whereby when the rod 15 reaches the end of its predetermined rearward travel, lug 35 trips or disengages lug 16. The plunger 20 now returns to its normal position, to again return the valves 12 to their normal position. The piston 6 moves to the end of its rearward travel and upon its forward movement swings the lever 39 in that direction. The operating rod 33 now travels forwardly, whereby lug 35 will engage the lug 16, and operate the valves 12, to supply steam to the rear end of the cylinder and exhaust steam from the forward end thereof. When the operated rod 15 has moved forwardly a predetermined distance, lug 35 disengages or trips lug 16, whereby plunger 20 and associated elements again returns the valves to their normal closed position. It is obvious that this operation may be continued indefinitely. When it is desired to vary the length of travel of the operated rod 15 to correspondingly vary the throw of the valves 12, the bell crank lever 28 is swung in the proper direction effecting a longitudinal movement of the adjusting elements or blocks 26, whereby the guide blocks 29 are raised and lowered. It is obvious that this movement of the guide blocks will move the lug 35 laterally with respect to the lug 16, whereby the length of time that they will remain in engagement before tripping or disengaging may be varied.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. In a valve gear of the character described, the combination with swinging valves carrying laterally extending cranks, of an operated rod pivotally connected with the cranks to move the same and to be elevated thereby and carrying a laterally extending trip element, an operating rod arranged near and below the operated rod and carrying a laterally extending trip element to engage and disengage the first named trip element, and means to move the operating rod.

2. In a valve gear of the character described, the combination with swinging valves carrying laterally extending cranks, of an operated rod pivotally connected with the cranks to move the same upon its longitudinal movement and to be laterally moved by the cranks and carrying a laterally extending trip element, a longitudinally movable operating rod arranged in proximity to the operated rod and carrying a laterally extending trip to engage and disengage the trip element, and means to move the operating rod longitudinally.

3. In a valve gear of the character described, the combination with swinging valves carrying laterally extending cranks, of an operated rod pivotally connected with the cranks to move the same upon its longitudinal movement and to be laterally moved by the cranks and carrying a laterally extending trip element, a longitudinally movable operating rod arranged in proximity to the operated rod and carrying a laterally extending trip element to engage and disengage the first named trip element, means to vary the lateral distance between the trip elements when the trip element carried by the operated rod is in the normal starting position, and means to move the operating rod longitudinally.

4. In a valve gear of the character described, the combination with a plurality of cranks to move valves, of an operated rod pivotally connected with the cranks to move the same upon its longitudinal movement and to be laterally moved by the cranks and carrying a trip element, a longitudinally movable operating rod arranged in proximity to the operated rod and carrying a trip element to engage and disengage the first named trip element, and means to move the operating rod.

5. In a valve gear of the character described, the combination with a plurality of cranks to move valves, of an operated rod pivotally connected with the cranks to move the same upon its longitudinal movement and to be laterally moved by the cranks and carrying a trip element, a longitudinally movable operating rod arranged in proximity to the operated rod and carrying a trip element to engage and disengage the first named trip element, means to move the operating rod, and automatic means to return the operated rod to the normal starting position upon being released.

6. In a valve gear of the character described, the combination with a swinging crank, of an operated rod pivotally connected with the crank to move the same upon its longitudinal movement and to be laterally moved by the crank and carrying a trip element, a longitudinally movable operating rod arranged in proximity to the operated rod and carrying a trip element to engage and disengage the first named trip element, means to move the operating rod, and automatic means to return the operated rod to the normal starting position.

7. In a valve gear of the character described, the combination with a swinging crank, of an operated rod pivotally connected with the crank to move the same upon its longitudinal movement and to be laterally moved by the crank and carrying a trip element, a longitudinally movable operating rod arranged in proximity to the operated rod and carrying a trip element to engage and disengage the first named trip element, means to move the operating rod, a closed cylinder arranged near the operated rod, a plunger arranged within the closed cylinder, and means connecting the plunger and the operated rod.

8. In a valve gear of the character described, the combination with a swinging crank, of a substantially horizontal operated rod pivotally connected therewith to move the same upon its longitudinal movement and to be laterally moved by the crank and carrying a trip element, a substantially horizontal operating rod arranged near and below the operated rod and carrying a trip element to engage and disengage the first named trip element, guide means for the operating rod, a vertically swinging lever connected with the operating rod and operated by a movable part of the engine, and automatic means to return the operated rod to the normal position upon being released.

9. In a valve gear of the character described, the combination with a swinging crank, of a substantially horizontal operated rod pivotally connected therewith to move the same upon its longitudinal movement and to be laterally moved by the crank and carrying a trip element, a substantially horizontal operating rod arranged near and below the operated rod and carrying a trip element to engage and disengage the first named trip element, vertically adjustable guide means for the operating rod, means to move the operating rod, and automatic means to return the operated rod to the normal position when moved therefrom.

In testimony whereof I affix my signature in presence of two witnesses.

VERNON L. CAPWELL.

Witnesses:
MARY E. DEAN,
J. W. WILLIAMS.